July 12, 1927.

C. A. DAVIS

POWER TOOL

Filed Dec. 8, 1922

Claud A Davis
INVENTOR
By Geo E Kirk
ATTORNEY

July 12, 1927.
C. A. DAVIS
1,635,463
POWER TOOL
Filed Dec. 8, 1922
2 Sheets-Sheet 2
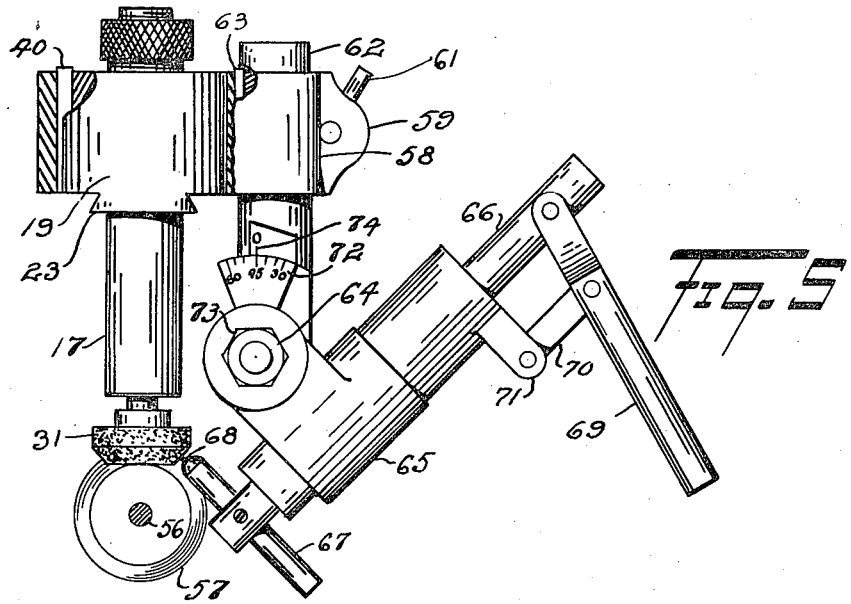
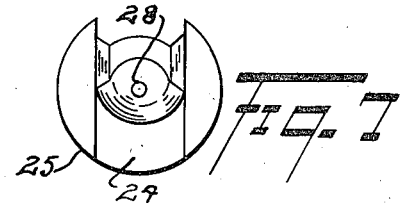
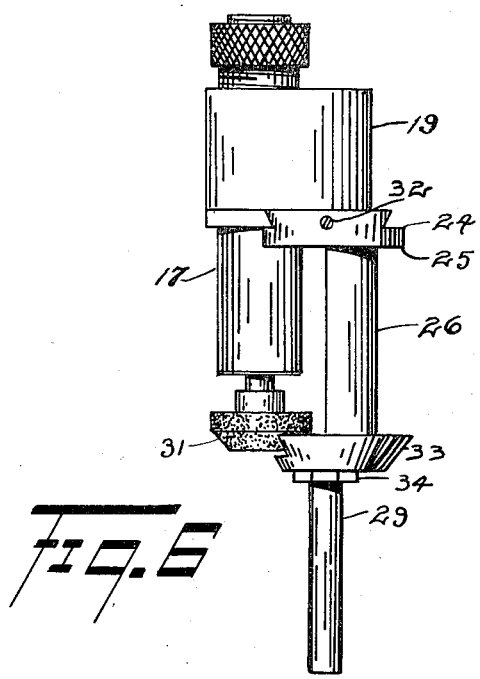
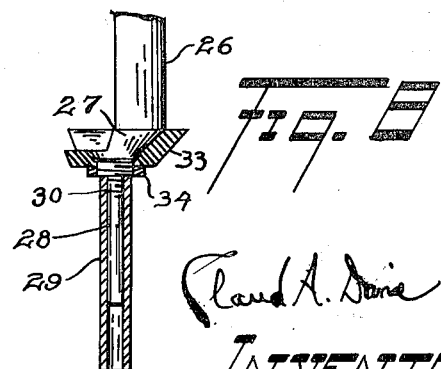

Patented July 12, 1927.

1,635,463

UNITED STATES PATENT OFFICE.

CLAUD A. DAVIS, OF TOLEDO, OHIO, ASSIGNOR, BY MESNE ASSIGNMENTS, TO THE HALL MFG. COMPANY, OF TOLEDO, OHIO.

POWER TOOL.

Application filed December 8, 1922. Serial No. 605,690.

This invention relates to power operated tools.

This invention has utility when incorporated in grinders, especially for the co-acting portions of poppet valves in internal combustion engines of motor vehicles.

Referring to the drawings:—

Fig. 5 is a vertical section on the line V—V Fig. 3;

Fig. 6 is a set up of the grinder as shown in Fig. 1 on an enlarged scale;

Fig. 7 is a top plan view of the radial adjustment device as used in Fig. 6; and Fig. 8 is a fragmentary view of the mounting device of Fig. 6 showing adjustment for different diameter seats.

Figure 1:
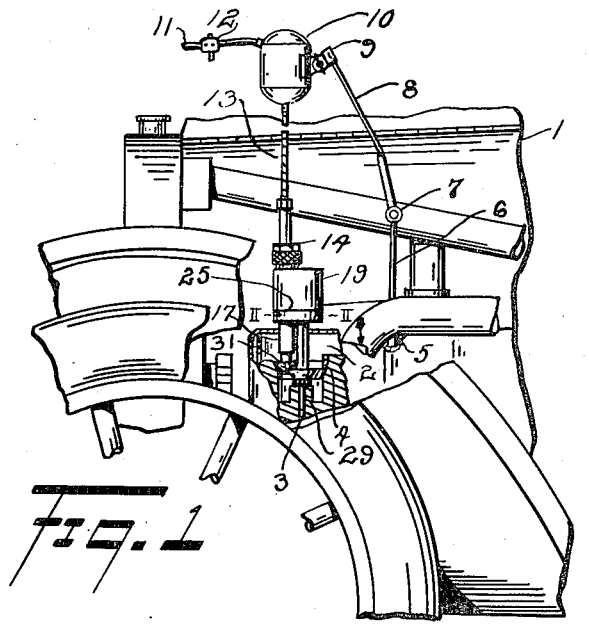
Fig. 1 is a fragmentary view of a motor vehicle, showing an embodiment of the invention incorporated therewith as a valve grinder for poppet valves.
Figure 4:
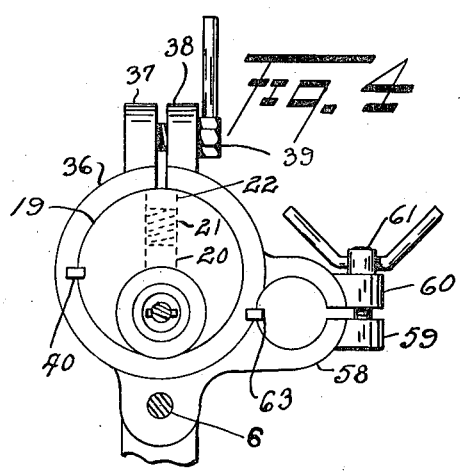
Fig. 4 is a section on the line IV—IV Fig. 3.
Figure 2:
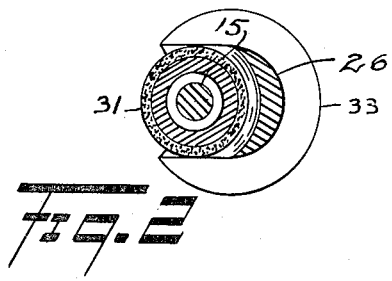
Fig. 2 is a section on the line II—II Fig. 1, on an enlarged scale and looking in the direction of the arrow.
Figure 3:
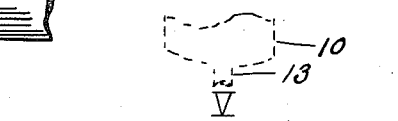
Fig. 3 is a mounting set-up for the poppet member of the valve assembly as distinguished from the seat member of the valve assembly shown in Fig. 1.
Figure 3:
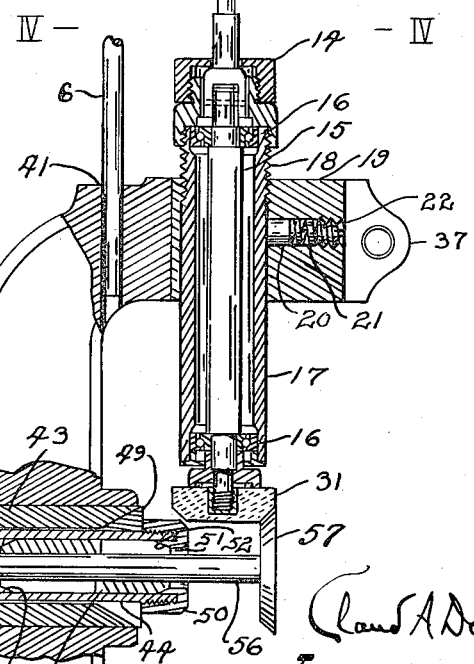

Motor vehicle 1 is shown as having valve chamber 2 provided with stem guideway 3 therefrom. Concentric with this stem guideway 3 is taper valve seat 4. Mounted in the bolt hole 5 of the motor vehicle 1 is upstanding rod 6 as an element in an adjustable bracket having joint 7 connected by extension 8 to adjustable clamp 9 engaging motor 10 to which electric power supply lines 11 extend past switch 12. From this electric motor 10 extends downward flexible shaft 13 to be held in assembled relation by nut 14 for driving grinder shaft 15 mounted in anti-friction bearings 16 carried by long sleeve 17. This sleeve 17 has upper threaded portion 18 permitting adjustment in and out of eccentric holder 19. This sleeve as a long bearing for the shaft 15 is held seated in the holder 19 by block 20 acted upon by spring 21, the compression of which is adjusted by set screw 22.

This holder 19 has dovetail lower portion 23 which may engage in dovetail way 24 of mounting 25. From this mounting 25 is a crescent shaped downward extension 26 to cone portion 27 terminating in stem 28. Sleeve 29 on this stem 28 may engage upward threaded portion 30 of the stem 28, thereby forming a stem or guide of the diameter of the valve stem guide 3 for properly centering the mounting 28, 27, 26, 25, as to the valve chamber 2. The diameter of the valve chamber 2 or the wear in rotary grinder or abrasive element 31 carried by the shaft 15 may be taken care of for the re-grinding of the seat 4 by the radial adjustment or eccentric position of the sleeve 17 in the dovetail mounting 23, 24. Once said radial position is determined, set screw 32 may hold the mounting in such locked position as to the holder 19.

In operation for grinding the valve seat 4, the switch 12 may be operated to start the motor 10 and the grinder 31 as rotating may be shifted about the taper seat 4 by the operator gripping the holder 19. The taper face 27 is of partial extent so that the grinder 31 may protrude therefrom. This taper portion 27 coacts with taper seat as a seated means for the mounting in holding the grinder 31 against vibration in the grinding operation, thereby insuring a true circular seat for the valve. As the sleeve 29 is an adjustment for snug fitting of the mounting in the guide 3 to accommodate different sizes thereof, there is also provision by supplemental frictional cone 33 as mounted by nut 34 over the minimum size cone 27 to take care of larger diameters of valve sizes so that the cone may in each instance seat on the taper of the valve in thus giving more substantial holding for the valve grinding device.

This same general mechanism is readily adapted for grinding the valve as well as the valve seat. To this end a set up mounting or bracket 35 is provided, which may be mounted in a hole in a bench or be clamped into position by a vise. In this set-up mounting 35 is overhang to provide a clamp portion 36 split to have ears 37, 38, which may be drawn together by operating bolt 39 to clamp the holder 19 in adjusted position in the set up mounting 35. Key 40 serves to determine the angular position of the holder 19 in this clamp mounting, but the holder may be adjusted up and down in this mounting. Seat 41 in this set up mounting 35 may be engaged by rod 6 of the adjustable bracket for carrying the motor to rotate the abrasive element or grinder 31. This set up mounting for rotating the grinder 31 may be for dressing the grinder or for having the grinder dress or re-grind the valve proper. In this latter instance the set up mounting in its upstanding portion has opening 42 therethrough in which is snugly seated double taper sleeve 43 as a bearing. Within this sleeve 43 and loosely therefrom is a sleeve 44 having threaded engagement with tubular member 45 connected by crank 46 for effecting rotation of this sleeve 44 in the sleeve 43.

The bearing faces of the sleeve 43 are on tapered ends. Mounted on this sleeve 44 is nut 47 which may be adjusted to compress springs 46' and thereby snugly shift the taper bearing elements 48 against one taper face of the sleeve 43 as an automatic take up, while the other face of the sleeve 43 is engaged by split cone 49 positively adjusted on the sleeve 44 by nut 50. This nut 50 has an inwardly extending portion 51 coacting to engage taper end 52 of kerfed sleeve 53 to force opposite end 54 of the kerfed sleeve 53 against opposing end of auxiliary sleeve 55 abutting the tubular member 45. This operation of the nut 50 serves to grip this kerfed sleeve with the rotary bearing portions in the doubly tapered sleeve 43 to take up any lost motion in rotation as to this sleeve 43 and simultaneously engages valve stem 56 in the desired adjusted position to hold poppet valve 57 in position to be acted upon by the grinder 31. With the motor 10 rotating the grinder 31 a true face for this valve 57 may be formed by rotating the crank 46. This device is a simple quick assembly, free of any lost motion, so that the faces as produced are accurate.

In operation, of course there may develop wearing down of the grinder 31 and, to this end, it is desirable to have such wearing down be uniform and not disturb the proper facing of a valve or a valve seat. This dressing for preserving the condition of the grinder may occur even during the grinding operation.

The set up mounting 35 has supplementary clamp 58 having cheeks 59, 60, engaged by bolt 61 for gripping stem 62 in proper angular relation as determined by key 63. This stem 62 has trunnion 64 on which is mounted bearing 65 as a guide for reciprocable stem 66 terminally carrying transversely extending element 67 having diamond point or other dressing element 68, shiftable across the rotating working face of the grinder 31 as actuated by lever 69 carried by link 70 from ear 71. Fast with the guide or slide way 65 is scale 72, so that by loosening nut 73, this guide 65 may be rocked on the trunnion 64 into the desired angular position as to pointer 74 carried by the stem 62. There is thus provided a simple arrangement for dressing the various angles of taper valves. The structure of the disclosure is accordingly one which may be quickly and readily adapted to the wide range of poppet valve upkeep as well as upkeep of the tool itself.

What is claimed and it is desired to secure by United States Letters Patent is:—

1. A grinder device embodying a rotary grinder, a shaft therefor, a sleeve for the shaft, a pair of bearings mounting the shaft in the sleeve, a holder for the sleeve, a set up mounting for the holder, a motor, a motor sustaining bracket carried by the mounting, a drive connection between the motor and grinder shaft, and a valve mounting carried by this set up mounting for positioning the valve transversely of the axis of the grinder.

2. A grinder device embodying a rotary grinder, a shaft therefor, a holder for the shaft, a mounting for the holder eccentric of the shaft and providing a way, a support for the mounting anchored in said way, and a drive for the shaft and support independently of the shaft and holder.

3. A grinder tool set up mounting including a rotary grinder first holder, said mounting providing a second holder axially intersecting said grinder holder axis as extended and at right angles thereto, and a third adjustable holder provided by said mounting and directed in proximity to said grinder holder axis extended and at angle to the first and second holders.

In witness whereof I affix my signature.

CLAUD A. DAVIS.